United States Patent [19]

Mushin

[11] Patent Number: 6,138,369
[45] Date of Patent: *Oct. 31, 2000

[54] LEVEL INDICATOR FOR A WALL-MOUNTED FIXTURE

[76] Inventor: Uriel Mushin, 10 Azelea Trail, Bellaire, Tex. 77401

[*] Notice: This patent issued on a continued prosecution application filed under 37 CFR 1.53(d), and is subject to the twenty year patent term provisions of 35 U.S.C. 154(a)(2).

[21] Appl. No.: 09/057,186

[22] Filed: Apr. 8, 1998

[51] Int. Cl.[7] .................................................. G01C 9/26
[52] U.S. Cl. .................................. 33/379; 33/333; 33/371
[58] Field of Search ........................... 33/374, 376, 379, 33/380, 384, 809, 333, 347, 370, 371

[56] References Cited

U.S. PATENT DOCUMENTS

| | | |
|---|---|---|
| 20,943 | 7/1858 | Fritschler . |
| 456,086 | 7/1891 | Forwood . |
| 684,846 | 10/1901 | Moss .......................................... 33/374 |
| 721,694 | 3/1903 | Green . |
| 787,940 | 4/1905 | Perks ......................................... 33/384 |
| 1,204,768 | 11/1916 | Hommel .................................... 33/389 |
| 2,667,704 | 2/1954 | Dunn .......................................... 33/374 |
| 3,116,563 | 1/1964 | Gelbman .................................... 33/207 |
| 3,762,058 | 10/1973 | Heater ........................................ 33/809 |
| 4,100,681 | 7/1978 | Hollander ................................... 33/389 |
| 4,208,802 | 6/1980 | Berndt ....................................... 33/347 |
| 4,212,123 | 7/1980 | Robin ..................................... 40/152.1 |
| 4,228,982 | 10/1980 | Sellera ..................................... 248/467 |
| 4,473,957 | 10/1984 | Faulkner .................................... 33/180 |
| 4,883,247 | 11/1989 | Crandall .................................... 248/542 |
| 4,944,094 | 7/1990 | Depiano et al. ........................... 33/371 |
| 4,989,332 | 2/1991 | Worrallo .................................... 33/376 |
| 5,080,317 | 1/1992 | Letizia ....................................... 248/544 |
| 5,103,573 | 4/1992 | Ehling et al. .............................. 33/613 |
| 5,155,917 | 10/1992 | Townsend et al. ........................ 33/374 |
| 5,165,650 | 11/1992 | Letizia ....................................... 248/467 |
| 5,353,509 | 10/1994 | Black ......................................... 33/451 |
| 5,454,542 | 10/1995 | Hart .......................................... 248/494 |
| 5,463,817 | 11/1995 | Leeds ........................................ 33/371 |
| 5,588,217 | 12/1996 | Lindner et al. ........................... 33/379 |
| 5,802,729 | 9/1998 | O'Brien et al. ........................... 33/371 |
| 5,848,489 | 12/1998 | Hartley et al. ............................ 33/333 |

FOREIGN PATENT DOCUMENTS 13436    6/1887   United Kingdom ..................... 33/379

*Primary Examiner*—G. Bradley Bennett
*Attorney, Agent, or Firm*—The Matthews Firm; William P. Ramey, III

[57] ABSTRACT

A device is provided for leveling a wall-mounted fixture such as a picture frame. The device has a mounting element, which can be fastened to a back surface of the fixture at a suitable location, such as a corner. A retractable level formed of multiple telescoping cylinders is mounted with the mounting element. The level is movable between a hidden position and a viewing position. In the hidden position the level is retracted into a recess in the mounting element so that the level is substantially hidden from an observer viewing the fixture. In the viewing position the level is extended outwardly from the mounting element for use in leveling the fixture.

10 Claims, 2 Drawing Sheets

LEVEL INDICATOR FOR A WALL-MOUNTED FIXTURE

BACKGROUND OF THE INVENTION

1. Field of the Invention

This invention pertains to a device for leveling a wall-mounted fixture, and particularly to a device that can be permanently mounted to a fixture, such as a picture frame, for leveling the fixture from time to time.

2. Description of the Related Art

Picture frames and other wall fixtures, which are hung or suspended from a wall, become misaligned over time and require realignment. A conventional carpenter's level could be used when realigning a picture frame. However, time would be required to locate a level for use, and the size of the level might make its use cumbersome. U.S. Pat. No. 4,944,094 shows a level indicator for leveling a picture frame. Such an indicator includes structure for attaching the level to the frame, so that it might be left there. However, the indicator would be visible outside the frame and detract from the appearance of the fixture.

U.S. Pat. No. 4,208,802 shows a level indicator attachable to a fixture for use in leveling it. The level indicating bubble extended outside of the frame or fixture so that it was visible while the frame was being leveled during installation. However, the visible outwardly extending portions of the level indicator would be an unsightly feature if the indicator were left attached after the fixture had been leveled. For this reason, this level indicator was constructed so that outer portions of it extending beyond the frame broke away from the frame during installation. If the frame later needed leveling, a new indicator was needed.

U.S. Pat. No. 4,212,123 shows a positioning device attached to a picture frame. The device is secured to the back of a picture frame or fixture adjacent to a side edge. A pivotal indicator arm with indicator enlargements or tabs at opposite ends is mounted on the rear of the frame or fixture so that the arm extends vertically when the fixture is mounted in a proper level position. Thus, the enlargements would only be visible if the frame is out of alignment. However, the sizing and installation of such an indicator would need to be coordinated with the type of frame or fixture with which it is used. For this type of alignment device to properly function, the size of the tabs was required to be such that they would be visible upon misalignment of the frame. For small fixtures or frames, enlargement tabs of too great a size would be visible regardless of the frame position. Conversely, small tabs might not be visible on larger frames even when the frame was out of level.

SUMMARY OF THE INVENTION

Briefly, the present invention provides a leveling device that can be attached to a wall-mounted fixture for use during installation and for use in subsequent realignment. A mounting element is secured to a back surface of the fixture, and a level is engaged with the mounting element. The level is movable between a viewing position and a concealed position. The mounting element has a recess for receiving and concealing the level, and after installation of the fixture, the level is stowed in the recess. When the fixture later becomes misaligned, the level is conveniently available and can be extended for use in realigning the fixture. Thus, the present invention provides a level for use during installation that can be retracted into a concealed position, from which it is conveniently available for use in later realigning the fixture.

BRIEF DESCRIPTION OF THE DRAWINGS

A better understanding of the present invention can be obtained when the following detailed description of a preferred embodiment of the invention is considered in conjunction with the drawings, which are described as follows.

DETAILED DESCRIPTION OF THE INVENTION

Figure 1:
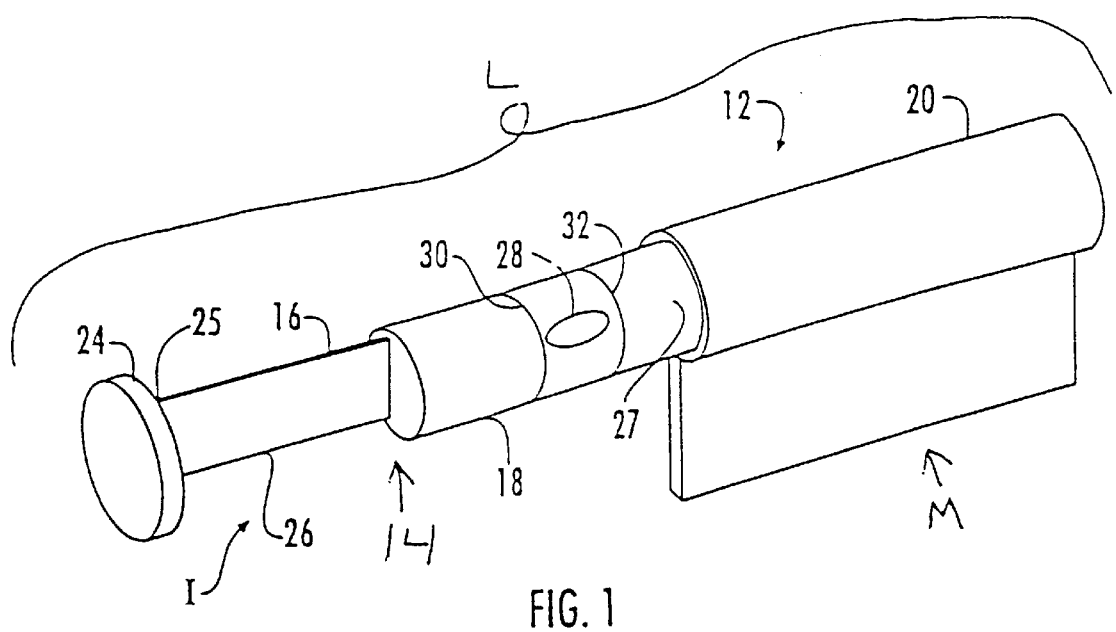
FIG. 1 is a front elevation view of a leveling device according to the present invention in an extended position.
Figure 3:
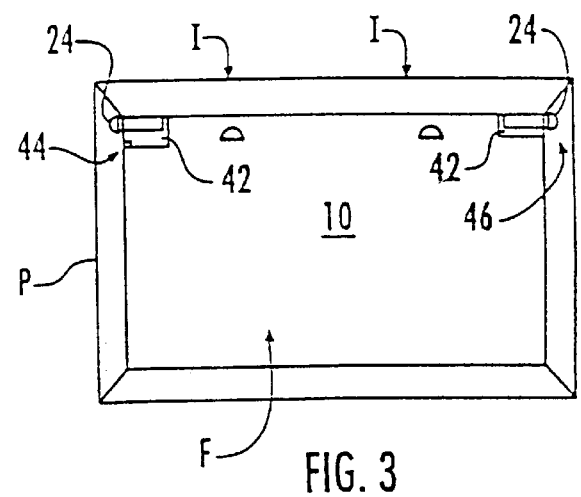
FIG. 3 is a rear elevation view of level devices of FIG. 1 attached to a fixture for use.
Figure 2:
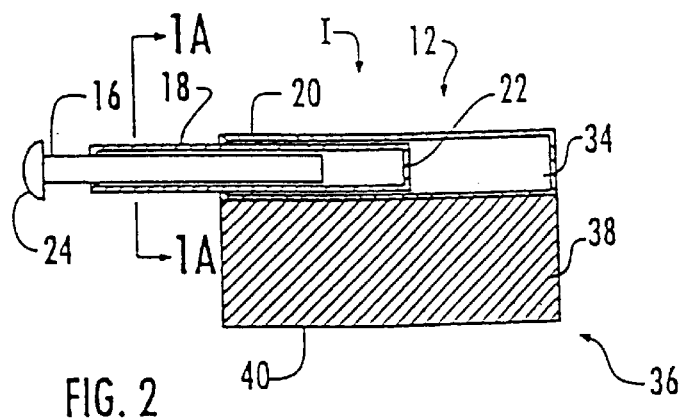
FIG. 2 is a front elevation view of the leveling device of FIG. 1, in a retracted or concealed position.
Figure 4:
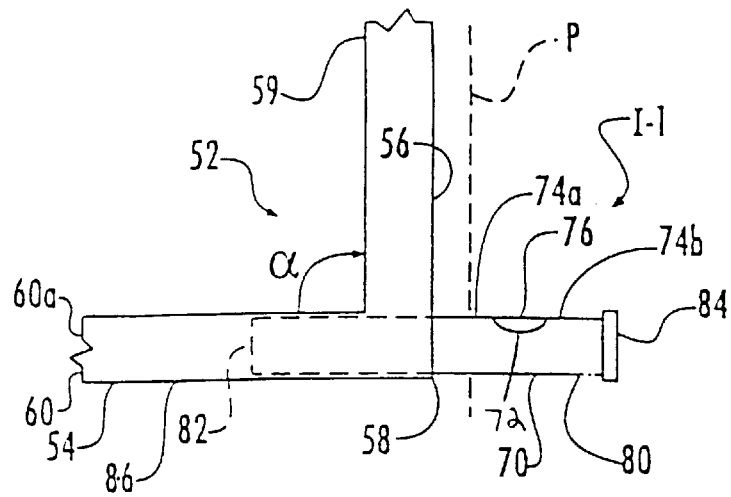
FIG. 4 is a front elevation view of an alternate leveling device of the present invention.

In the drawings, a level indicator or leveling device I according to the present invention is shown in FIGS. 1–3. The indicator I is adapted to be attached to a wall mounted fixture F for use during installation and for subsequent repeated use in realignment of the fixture F. The fixture F may be any of numerous types of wall fixtures, such as frames for pictures, mirrors, photographs or the like, as well as art objects, shelves, signs and other conventional wall-mounted items. With the level indicator I, the fixture F can be easily adjusted to a desired level position. After this is done, the indicator is retractable to a position where it is behind the fixture so that its presence does not detract from the appearance of the fixture.

The level indicator I of FIGS. 1–3 includes a mounting element or plate M which is adapted to be attached or secured to back surface 10 of the fixture F (FIG. 3) which in this instance is a framed article such as a painting, print, photograph or other item. A level L is retractably moveable within the mounting element M between an extended or viewing position (FIG. 1) and a retracted or concealed position (FIGS. 2 and 3).

The mounting element M includes a generally tubular receptacle or sleeve 12 into which the level L is movably fitted. The sleeve 12 is formed of a suitable material such as a synthetic resin. The level L is a segmented, telescoping hollow tube 14 composed of two or more multiple concentric cylinders, such as those shown at 18 and 20. The cylinders 18 and 20 are formed of a suitable transparent plastic or synthetic resin.

Figure 1A:
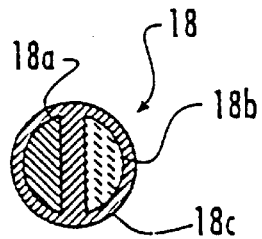
FIG. 1A is a cross-sectional view taken along the lines 1A—1A of FIG. 1.

An outermost cylinder 20 is fixedly mounted along mounting plate M. An inner cylinder 18 is telescopingly received within the outermost cylinder 20, and is extendable and retractable with respect to the sleeve 20. A rod or shaft 16 is telescopingly extendable and retractable within the sleeve 18. The rod 16 is of a semi-cylindrical cross-section (FIG. 1A) or other shape, so that it may slidably move within a correspondingly formed longitudinal socket 18a that is formed in a rear portion of sleeve 18.

A contact grip or knob 24 is formed at an outer end 25 of a connector pin or tab, 26 mounted with an end 25 of the shaft 16. The contact grip 24 provides a gripping surface so that the shaft 16 and cylinders 18 and 20 of tube 14 may be extracted from the sleeve 12. A front or inner longitudinal, liquid-containing tube 18b of the sleeve 18 of hollow tube 14 of level L is filled with a liquid 27, usually of an opaque nature or color. The liquid-containing tube 18b of sleeve 18 is separated from the socket 18a by a barrier or septum 18c. The liquid 27 in tube 18b contains a bubble 28 of a gas or liquid which is not miscible in the liquid 27. The bubble 28 is thus visibly apparent in the liquid 27 and moves within the tube 14 according to the relative horizontal position of the level L. A set of guide rings 30 and 32 are formed in a portion 34 on the level L at which the bubble 28 is located. The guide rings 30 and 32 extend a suitable distance around sleeve 18 to indicate when the indicator I is in a suitably horizontal position. The sleeve 12 has a base or fixed portion 34 to where the end portion 22 of the sleeve 20 is connected.

The mounting plate M includes a carrier or connector plate 36, also of a suitable synthetic resin, is formed extending outwardly from the sleeve 12. The carrier plate 36 has a suitable adhesive substance 38 focused on a flat contact surface 40. The adhesive substance 38 attaches the indicator I to the back or rear surface 12 of the fixture F with which the indicator I is to be used. The indicator I can be mounted to the fixture F so that knob 24 does not extend beyond a border P of the fixture F. If desired an adhesive square or patch 42 may be formed at a desired location on the fixture F.

The location of attachment of indicator I will of course vary depending on the material of the fixture to which it is installed. For framed articles or fixtures, it is preferable to apply the indicator I at one or both of the top corners, as indicated at 44 and 46, for leveling purposes. These upper portions of the fixture frame are usually slightly farther from the wall or surface once the fixture is hung, providing slightly larger clearance for installation and use of the indicator I. The level indicator I of the present invention is mounted at a suitable location on the fixture F. As has been noted, the location of attachment of indicator I may vary according to the fixture. After the indicator I is attached, the fixture F is then mounted or hung on a wall or other surface.

To level the fixture during mounting, the knob 24 is used to extract telescoping cylinders of tube 14 of level L from the sleeve 12 so that the bubble 28 is visible. Adjustments are then made until bubble 28 and guide rings 30 and 32 indicate a level, horizontal position of fixture F is achieved. Tube 14 can then be returned to its retracted position behind portions of the fixture F, so that the appearance or aesthetics of fixture F are not impaired.

Once the indicator I is attached, the fixture F maybe thereafter leveled position many times as the need arises. The level L is simply extended from it concealed or retracted position (FIGS. 2 and 3) to its extended or visible position (FIG. 1). The fixture F is then adjusted to a correct position, and level L returned to its concealed position. It is to be noted that the indicator I may stay mounted with the fixture F if it is removed and stored. When the fixture F is to be reinstalled, the already attached indicator I is available for reuse.

In FIGS. 4–7, an alternate level device or indicator I-1 is shown. The level device includes a mounting element 52 to receive a level L-1. The mounting element includes a horizontal leg 54 and a vertical leg 56 and is adapted to be attached on a rear surface of a fixture of the types discussed above, at or near a border or edge, as indicated by a phantom line P.

The mounting element 52 has a general L shape, with vertical leg 56 joined to horizontal leg 54 at an angle a, typically a right angle. The mounting element 52 is typically formed of a suitable synthetic resin by molding or other conventional techniques. The horizontal leg 54 of element 52 extends from a first end 58 adjacent vertical leg 56 to an opposing second end 60. The vertical leg 56 extends upwardly from a lower portion 47 near leg 54 to an upper end portion 59. The horizontal leg 54 and vertical leg 56 have frontal plane surfaces 54a and 56a which are co-extensive with each other defining a common, coplanar frontal contact surface 61, which is adapted to receive a suitable adhesive for attaching the level indicator L-1 to the rear surface of the fixture, as will be set forth.

A generally tubular receptacle 62 is formed with the horizontal leg 54 rearwardly of its frontal plane surface 54a. The receptacle 62 may be integrally formed with horizontal leg 54 or it may be mounted to mounting element 52 by a suitable adhesive layer 64. The tubular receptacle 62 is a square or rectangular member or tube having a length generally corresponding to that of horizontal leg 54, with opposing ends 58a and 60a and side walls 62a, 62b, 62c and 62d defining an interior chamber or recess 68 into which the level L-1 is slidably retractable or movable. An adhesive layer 65 is provided over the frontal contact surface 61 for securing mounting element 52 to a rear surface of the fixture. A removable protective cover sheet 66 typically is provided to cover adhesive layer 65 for convenience in storage and in handling prior to use of level indicator I-2. Cover sheet 66 is removed prior to fixing mounting element 12 to the fixture.

Figure 5:
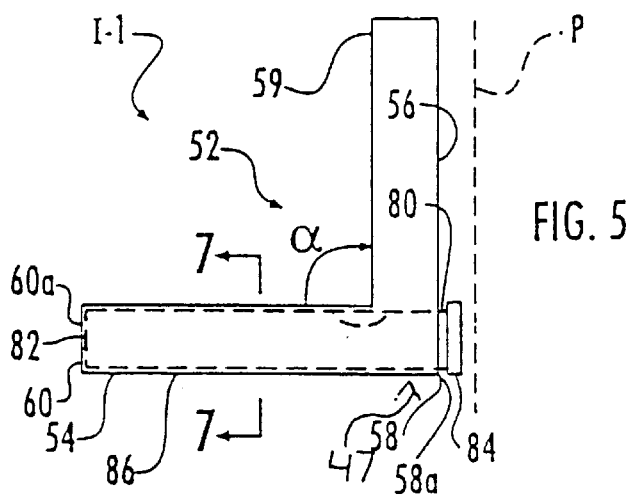
FIG. 5 is a front elevation view of the leveling device of FIG. 4 in a retracted position.
Figure 6:
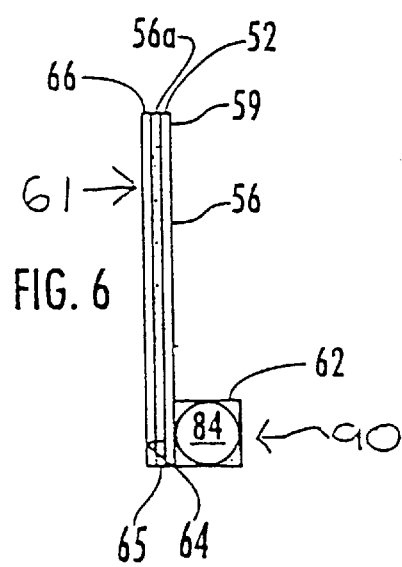
FIG. 6 is a side elevation view of the leveling device of FIG. 4.
Figure 7:
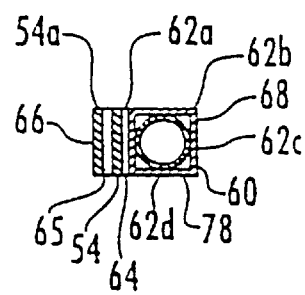
FIG. 7 is a cross sectional view taken along the lines 7—7 of FIG. 5.

The level L-1 includes a level tube 70 which is received for relative sliding movement along its longitudinal axis A in recess 68 of receptacle 62. Level tube 70 slides in and out of receptacle 62 and is thus retractable (FIG. 5). Level tube 70 can be connected to receptacle 62 using telescoping sections to extend the level tube farther from the receptacle. Level tube 70 of level L-1 is generally substantially filled with a suitable liquid, but also contains a gas bubble 72 which moves within the liquid according to the relative disposition of level L-1. Suitable indicators or marks 74a and 74b are formed on an outer surface of level tube 70. Marks 74a and 74b are formed at positions on level tube 70 to indicate, when bubble 72 is between them, that level L-1 is in a proper horizontal plane. It is to be noted that a user need not be at the same height as the level L-1 when using it. The bubble 72 is visible in the level tube 30 from positions below the level L during its use.

Level tube 70 can, if desired, be slightly bowed and have an apex or slightly higher central position 76 so long as slidable movement of level tube 70 in receptacle 62 is not impaired. When level tube 70 is level and properly aligned with the horizon, bubble 72 centers at apex 76 between marks 74a and 74b. Level tube 70 may be provided with a guide 78 attached along its length, which engages an inside corner of receptacle 62 defined by side walls 62c and 62d to insure that the apex 76 of level tube 70 remains in an upright or uppermost position with respect to the level indicator I-1. Level tube 70 extends between an outside end 80 and an inside end 82 within receptacle 62.

A cap 84 is secured to outside end 80 of level tube 70. Cap 84 provides a grip for grasping and pulling level tube 70 out of receptacle 62 so that bubble 72 may be visible. Level tube 70 must fit sufficiently snug within receptacle 62 so that longitudinal axis A of level tube 70 remains parallel with a bottom edge 86 of horizontal leg 54 to ensure that a horizontal indication provided by level tube 70 is a reliable indication that bottom edge 86 is horizontal. Provided bottom edge 86 is properly aligned with the desired horizontal axis of the fixture, then a horizontal indication provided by level tube 70 will provide a proper indication of the desired horizontal orientation for the fixture. Typically, a stop mechanism (not shown) is provided on inside end 82 of level tube 70 and within receptacle 62 to retain level tube 70 within receptacle 62 while permitting retractable sliding movement.

To use leveling device I-1 on a fixture, after cover sheet 66 is removed, adhesive layer 65 is pressed against a back surface of the fixture at a suitable location near the border or edge P, such as at a corner. With level tube 70 in receptacle 62, the cap 84 should not extend beyond the border or edge P (FIG. 5.). The present invention can be configured for use on any corner of the fixture, left, right, top or bottom. For fixtures without corners, the leveling device may be better concealed if vertical leg 16 is omitted. Leveling device I-1 is preferably configured for mounting on a top corner, where generally there is space between the fixture and the wall.

As an alternative to using adhesive layer 65 to secure mounting element 52 to the fixture, tacks, screws or nails through leg 56 or other attachment devices or methods can be used. Longitudinal axis A of level tube 70 is parallel with bottom edge 86 of horizontal leg 5. For a square or rectangular fixture, bottom edge 86 of leg 54 is placed in parallel with a bottom edge of the fixture, which places longitudinal axis A in parallel with a desired horizontal axis of the fixture when mounted on the wall. Vertical leg 56 can also be used for alignment with the outside edge or border P of the fixture.

Mounting element 52 can be secured to the fixture at the time the fixture is manufactured or just prior to installing it on a wall. After mounting element 52 is secured to the fixture and after the fixture is suspended on the wall, one grasps cap 84 and pulls to extend level tube 70 to a position where bubble 72 is fully visible. Level tube 70 is thus extended from receptacle 62 to a point beyond the border P, where bubble 72 is visible (FIG. 1). When extended, as shown in FIG. 1, level tube 70 can be used during installation of the fixture to indicate the desired horizontal orientation for the fixture. If bubble 72 does not fall between marks 74a and 74b, then the fixture is not aligned with the horizon. The fixture can then be moved until bubble 72 rests between marks 74a and 74b, which then indicates that the fixture is aligned with the horizon.

After the fixture is installed, level tube 70 can be concealed by lightly pressing on cap 84 and sliding level tube 70 back into a concealed position (FIG. 5) in recess 68 of receptacle 62, which is still attached to the fixture. When level tube 70 is retracted fully into recess 68, as limited by cap 84 contacting end 58a of receptacle 62, level indicator I-1 is substantially hidden and concealed from a casual observer viewing the fixture.

Should the fixture become later misaligned, the level indicator I-1 of the present invention is conveniently available on the fixture for use in realignment or leveling to the desired orientation. Cap 84 is grasped and lightly pulled to extend level tube 70 so that bubble 72 and marks 74a and 74b are beyond border or edge P and thus visible. Using level L-1 as a level indicator, the fixture is typically slightly rotated about a suspension point on the wall until it is realigned and again in a desired orientation. Level L-1 is then again concealed by lightly pressing on cap 84 and sliding level tube 70 into receptacle 62, where it remains hidden until needed again.

Additional features can be incorporated in the either of the preferred embodiments. For example, the rear surface 90 of receptacle 62 may be in contact with the wall on which the fixture is hung. Surface 90 can be adapted to have a rough or tacky surface or any suitable surface with a high coefficient of friction to inhibit movement of the fixture with respect to the wall, thus inhibiting subsequent misalignment. As another example of an additional feature, a level tube like that shown at 70 can be incorporated in a sleeve formed extending upwardly behind vertical leg 56. Also, the level tube 70 may be movable with respect to the mounting element 52 by other mechanisms than those permitting sliding retractions. For example, the level tube 70 may be movable through a hinge connection, with the level folding into a suitable recess on mounting element 52 for concealing the level tube 70.

From the foregoing, it can be seen that the level indicator or device of the present invention is conveniently available for use both when originally installing and subsequently realigning a wall-mounted fixture that may later become misaligned. At any time after mounting element 52 is secured to the fixture, level tube 70 is conveniently available for use in orienting or aligning the fixture. Leveling device I-1 conveniently remains on the fixture after initial attachment, even during storage, for future installation and for subsequent realignment of the fixture.

Thus, the present invention provides a level which is retractably engaged with a fixture, such as a picture frame, so that the level can be used to install the fixture in a desired orientation and to later realign the fixture in that desired orientation. When the level is not in use it can be retracted so that it is concealed. The present invention thus provides a level that is conveniently available for realigning a fixture, but is concealed when not in use.

The foregoing disclosure and description of the invention are illustrative and explanatory thereof, and various changes in the details of the illustrated apparatus and construction and method of operation may be made without departing from the spirit of the invention.

What is claimed is:

1. An improved leveling device for facilitating the leveling of a wall object such as a picture frame or a mirror, the wall object having at least one obscured portion when mounted on a wall which obscures at least a portion of the leveling device, the leveling device comprising:

the wall object;

an extensible housing having a first end, a second end, a first position, and a second position, the extensible housing being attached to the obscured portion of the wall object; and, a level indicator disposed about the second end of the extensible housing for indicating a position of the wall object relative to a known second object; wherein the extensible housing is obscured by the wall object in the extensible housing's first position and at least a portion of the extensible housing is not obscured by the wall object in the extensible housing's second position.

2. The improved leveling device of claim 1 wherein the extensible housing is totally obscured by the wall object in the extensible housing's first position.

3. The improved leveling device of claim 1 wherein the level indicator is disposed at least partially within the second end of the extensible housing.

4. The improved leveling device of claim 1 wherein the position indicator indicates a horizontal level position with respect to a ground.

5. The improved leveling device of claim 1 wherein the position indicator indicates a vertical level position with respect to a ground.

6. The improved leveling device of claim 1 wherein the obscured portion of the wall object is a back of the wall object.

7. The improved leveling device of claim 1 wherein the extensible housing comprises a base member.

8. The improved leveling device of claim 7 further comprising a first extensible member attached to the base member.

9. The improved leveling device of claim 1 further comprising a contact grip disposed about the second end.

10. The improved leveling device of claim 9 wherein the contact grip is attached such that the contact grip may facilitate the extensible housing from the first position to the second position.

* * * * *